United States Patent

Höfflinger

[11] Patent Number: 5,956,264
[45] Date of Patent: Sep. 21, 1999

[54] CIRCUIT ARRANGEMENT FOR DIGITAL MULTIPLICATION OF INTEGERS

[76] Inventor: Bernd Höfflinger, Allmandring 30, 70569 Stuttgart, Germany

[21] Appl. No.: 08/588,224

[22] Filed: Jan. 18, 1996

Related U.S. Application Data

[63] Continuation of application No. 08/295,843, filed as application No. PCT/DE93/00175, Mar. 1, 1993, abandoned.

[30] Foreign Application Priority Data

Feb. 29, 1992 [DE] Germany .................. 4206316
Apr. 21, 1992 [DE] Germany .................. 4213107

[51] Int. Cl.$^6$ ........................................... G06F 7/52
[52] U.S. Cl. ............................................. 364/757
[58] Field of Search ........................ 364/757, 754, 364/748.5

[56] References Cited

U.S. PATENT DOCUMENTS

| | | | |
|---|---|---|---|
| 4,031,377 | 6/1977 | Deutsch et al. ............... | 364/757 |
| 4,366,549 | 12/1982 | Katayama ................... | 364/757 |
| 4,555,768 | 11/1985 | Lewis, Jr. et al. ............ | 364/757 |
| 4,682,302 | 7/1987 | Williams ..................... | 364/754 |
| 4,720,809 | 1/1988 | Taylor ....................... | 364/748.5 |
| 4,852,038 | 7/1989 | Wagner et al. ............... | 364/748.5 |

*Primary Examiner*—Reba I. Elmore
*Assistant Examiner*—Monica Lewis
*Attorney, Agent, or Firm*—Antonelli, Terry, Stout & Kraus, LLP

[57] ABSTRACT

A circuit arrangement for digital multiplication of integers, having an encoding unit, an adding unit, which adds the output values of the encoding unit, and a decoding unit, which decodes the output value of the adding unit. The encoding unit encodes the numbers according to the following formula:

$$X = 2^{k} * (1 + X_B) = 2^k + X_B$$

$$Y = 2^{l} * (1 + Y_B) = 2^l + Y_B$$

The adding unit adds the values k, l and x and y, and the mixed terms $X_B * Y_B$ depending on the desired accuracy being either not formed or recursively calculated according to the preceding manner of procedure.

5 Claims, 7 Drawing Sheets

CIRCUIT ARRANGEMENT FOR DIGITAL MULTIPLICATION OF INTEGERS

This application is a application of Ser. No. 08/295,843, filed Jan. 27, 1995, now abandoned which is 371 of PCT/DE 93/08175 filed Mar. 01, 1993.

BACKGROUND OF THE INVENTION

1. Field of the Invention

The present invention relates to a circuit arrangement for digital multiplication of integers, having an encoding unit, which, in particular, can form the logarithm of the to-be-multiplied numbers, an adding unit, which adds the output values of the encoding unit, and a decoding unit, which delogarithmizes the output value of the adding unit.

Microelectronically integrated signal processors have great economic significance for all product sectors. Continued miniaturization has already led to considerable success in digital signal processing practice, e.g. the real time processing of language and image signals.

In this context reference is made, by way of illustration, to the article "Multiplier Policies for Digital Signal Processing" in IEE ASSP Magazine, 1990, pp. 6–20.

Miniaturization and attainable functionality of each microchip have, moreover, resulted in numerous attempts at realization of so-called neuronal networks and computers.

2. Description of the Related Art

Despite the tremendous progress made in miniaturization, the enormous number of convolution operations (multiplications, divisions, additions and substractions), needed, e.g., for the processing of HDTV signals, for real time identification of moving scenes and for the realization of neuronal networks or the like sets limits on raising the calculation speed as well as on further reduction of the "chip areas".

Analog and digital multiplications either have little companding (resolution), respectively are inaccurate (small signal-to-noise ratio) or have to be carried out with long word lengths, respectively be carried out with floating-decimal-point representation making necessary massive parallel processing practically impossible.

Due to accuracy and companding problems in digital processing, complicatedly constructed analog-digital and digital-analog converters with long word lengths are needed for processing the input and output analog signals, e.g., supplied by image sensors, display actuators or the like, which also greatly limit the feasability of such signal processing systems.

For this reason, the older German patent application P 40 33 507.0 describes a circuit arrangement based on the fundamental consideration that in many instances the attempt is made to optimally support and imitate sophisticated, natural processes, such, as e.g. seeing and hearing, with electronic signal processing.

These processes are distinguished by great companding ranges being scanned by so-called adaption for the signals related to seeing and hearing, such as brightness and sound intensity. It has been understood that electronically processable signal deviations, which nonetheless can describe relatively large companding ranges, are obtained by manipulating logarithms of these signals (the so-called logarithmic compressions). This is utilized, e.g., in the pulse code modulation of language and in image sensors using a logarithmic output signal.

Although various companding encodings have hitherto become known, e.g., the encodings according to the $\mu$-respectively A principle utilized in language encoding. These encodings were, however, introduced for the special demands of language transmission and are hardly generally applicable.

The known circuit arrangements for digital multiplication of integers, using an encoding unit, which forms the logarithms of the to-be-multiplied numbers, an adding unit, which adds the output values of the encoding unit, and a decoding unit, which delogarithmizes the output value of the adding unit, have however the drawback that both the "logarithmizing" and the "delogarithmizing" are time consuming and require a relatively large chip area corresponding to the suitable circuit elements.

SUMMARY OF THE INVENTION

The object of the present invention is to provide a device for the multiplication of integers, with which two integers can be multiplied with predetermined accuracy in a simple manner and with relatively little electronic input.

The present invention is based on the fundamental idea of digitally multiplying the integers X, Y by means of a recursive multiplication process, with the bits of highest value being processed first.

For this purpose, the numbers are first represented by the following formula:

$$X = 2^{k*}(1+x_B) = 2^k + X_B$$

$$Y = 2_l^*(1+y_B) = 2^l + Y_B$$

Subsequently the mantissas, hereinafter also referred to as DIGILOG mantissas, are multiplied according to the following formula:

$$X*Y = 2^k*(1+x_B) = 2^l*(1+y_B)$$
$$= 2^{k+1}*(1+x_B+y_B+x_By_B)$$

The product term $x_B y_B$ in this equation is a measure for the error of the DIGILOG product and can, on the other hand, be evaluated with the described DIGILOG process. The common elements of this conversion with the DIGILOG process can be plausibly represented if the sums of the mantissas are small or close to 1:

$$x_B y_B \approx 0: X*Y = 2^{k+l+1}(1+y_B)$$

$$x_B, y_B \approx 1: X*Y = 2^{k+l+1}(1+\{x_B+y_B\}/2)$$

The accuracy and companding (range of values) can be set by means of the selection of the word length in the mantissa and exponent independent of each other. An iterative application permits raising accuracy step by step if there are other time steps available in line with the timing of the system. The relative deviation from the mathematically accurate product, therefore, amounts to maximally 12% in relation to the remaining product term of the mantissas and reduces with recursive application of the DIGILOG process to zero.

BRIEF DESCRIPTION OF THE DRAWING

The present invention is made more apparent by way of example, without the intention of limiting the spirit or the scope of the present invention, using preferred embodiments with reference to the accompanying drawing to which explicit reference is made with regard to the disclosure of all the inventive details not explained more closely herein. Depicted is in.

DESCRIPTION OF THE PREFERRED EMBODIMENTS

Figure 1:
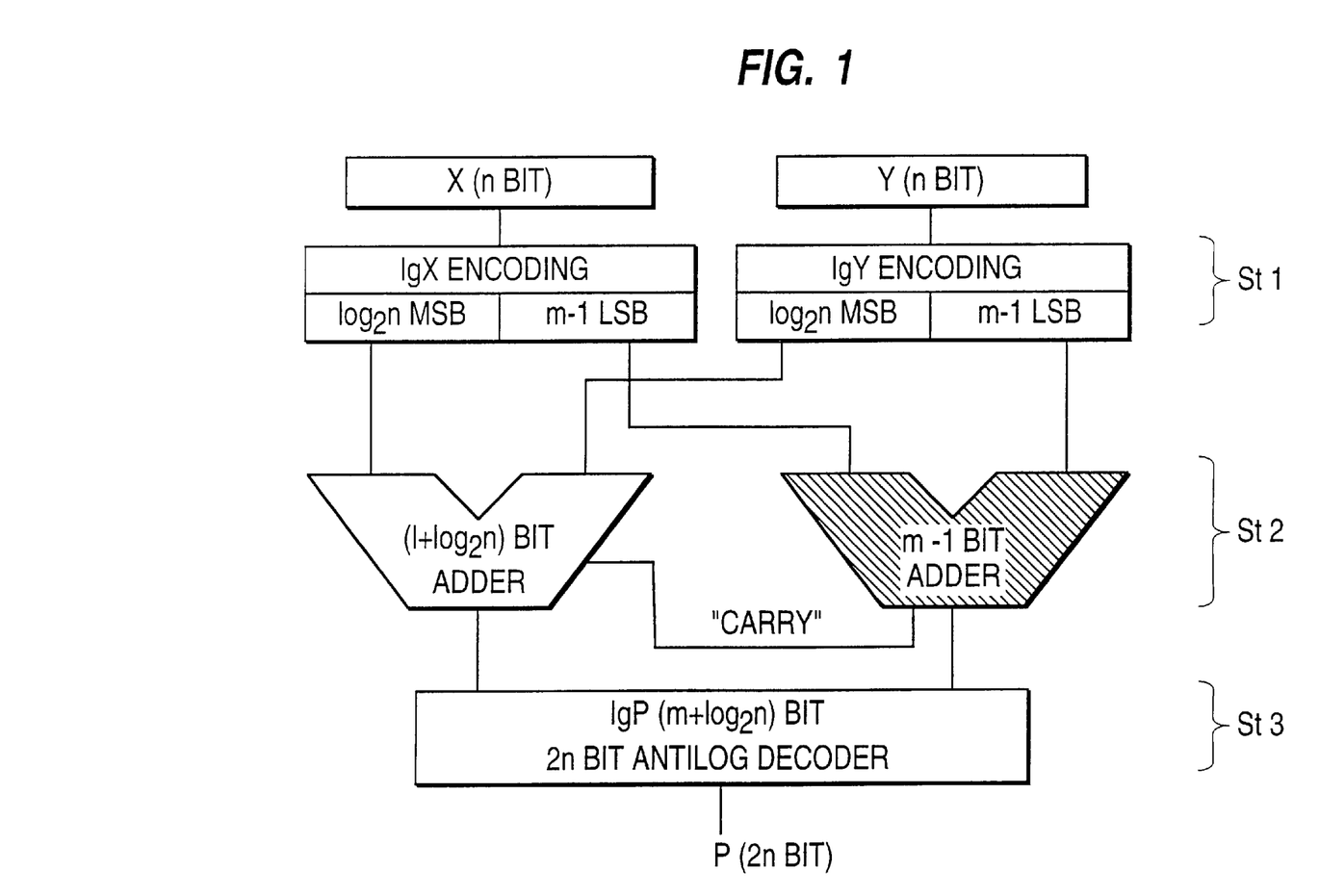
FIG. 1 a diagram of a preferred embodiment of an invented multiplier.

FIG. 1 shows a diagram of a preferred embodiment of a multiplier constructed according to the present invention. The mode of operation of the invented multiplier described in the preceding can be preferably realized using a three-step construction with steps St1, St2 and St3.

The (binary) input words X and Y, which in the shown preferred embodiment always have n bits, lie at the first step St1. The first step St1 takes over the segment encoding and linearization.

The segment encoding determines the highest value exponent of a binary number X. The linearization is conducted by a n-bit switch matrix, which is determined by the control signals of the segment encoding. This switch matrix is present for each of the two input words.

The switch matrix is made more apparent in the following.

The second step St2 takes care of the carry-select addition. In order to accelerate summation, the adder is constructed according to the carry-select procedure and is distinguished by a regular, scaleable construction of the overall circuit. It adds the linear parts $x_B$ respectively $y_B$, of the semilogarithmically coded factors. If there is a carry in the addition, the matrix result is moved to the left by another bit via the carry output.

Finally, the third step St3 takes over the segment encoding and exponential function. This switch matrix has the format $(m+n)^n$. In this step, the sum is moved to the left out of the adder by the segment of the sum of the exponents. This matrix is twice as large in layout as one of the other matrices. The pure matrix is made up of 256 n-channel transistors. It is composed of 64*8 transistors for moving the sum and further 128 transistors in order to create a defined zero level at undetermined outputs.

Figure 2A:
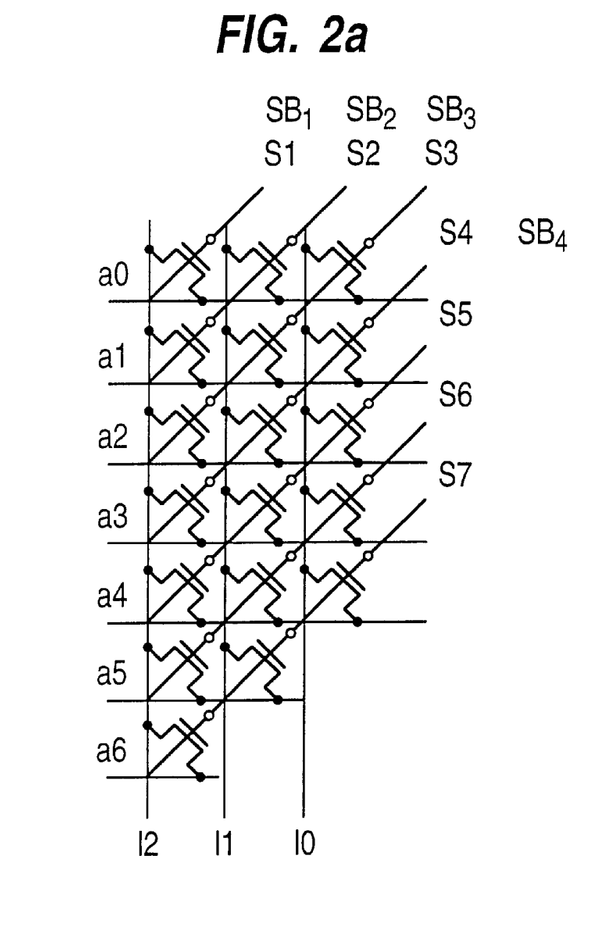
FIG. 2a and 2b switch matrix for the logarithmic function.

FIG. 2a shows a surface-efficient parallel switch matrix according to which a logarithmic n-encoding can be conducted. It has exclusively NMOS transistors. The circuit arrangement of the matrix permits simple implementation of power and radix functions using semilogarithmic numbers, with addition being possibly completely obviated. It is provided with the input connections a0, a1, a2, . . . , a6, has at disposal the segments S1 to S7 and, furthermore, is provided with the outputs I0, I1 and I2.

Figure 2B:
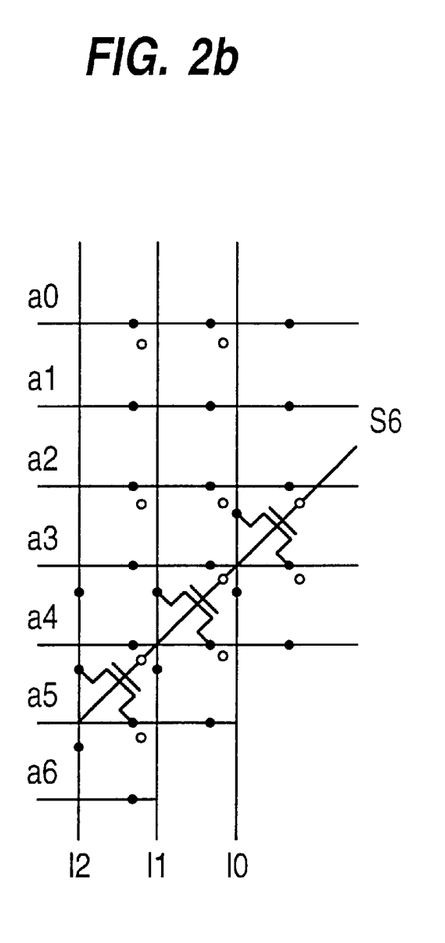

FIG. 2b shows a circuit state of the matrix shown in FIG. 2a in which the segment S6 is active.

Figure 3A:
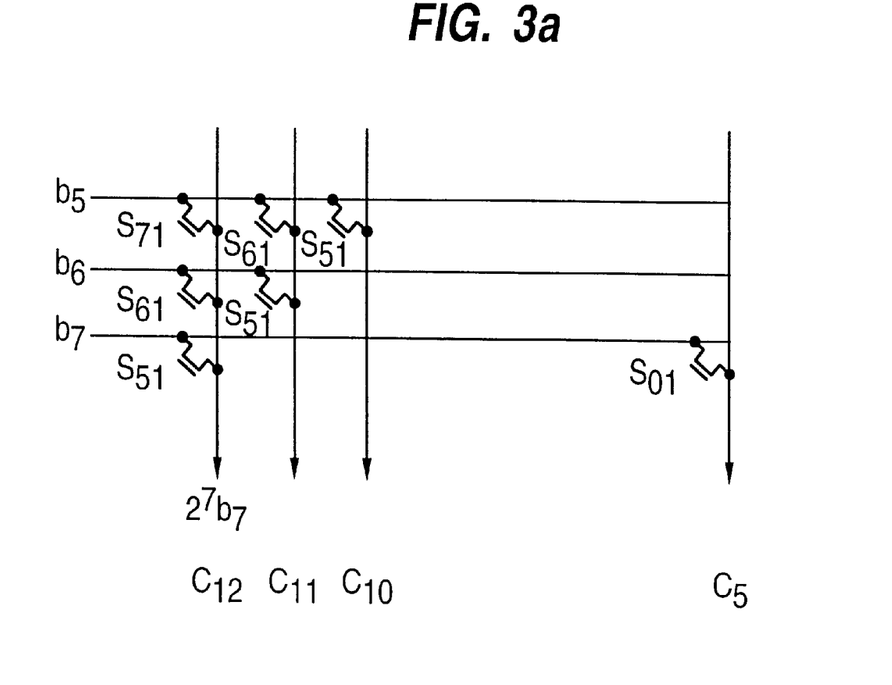
FIG. 3a and 3b a switch matrix for the operation $2^{j1}B=C$, D as well as a double switch matrix having the output $2^{j1}B=C$, $2^{j2}B=D$, FIG. 4 a circuit arrangement having a simple switch matrix and an accumulator, FIG. 5 a switch matrix having a double switch matrix, an adder and an accumulator, FIG. 6 a detector for the segment $S_{j2}$ in which the second ONE occurs, FIG. 7 circuit arrangement having two switched-in-parallel simple switch matrices, an adder and an accumulator.
Figure 3B:
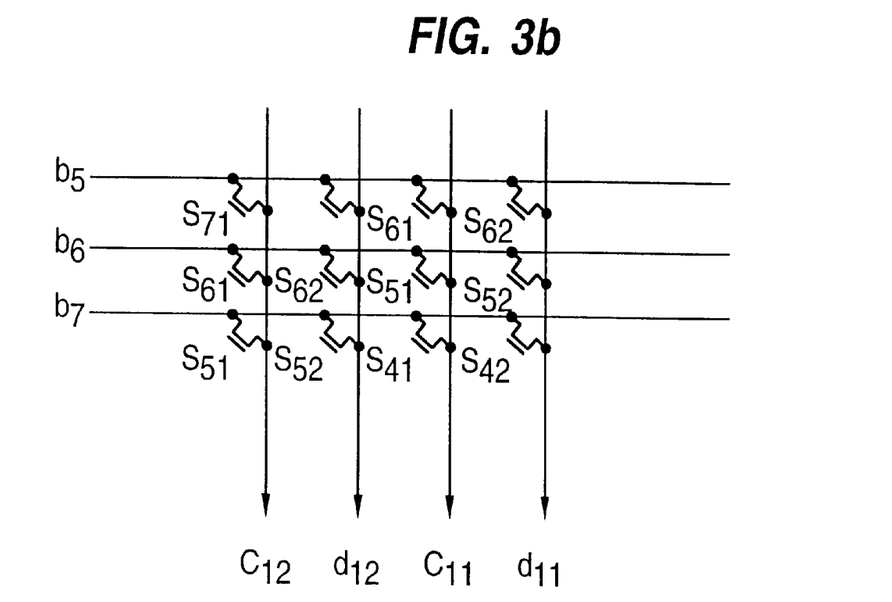

FIGS. 3a and 3b shows possible embodiments of the switch matrices, as they can, in particular, be employed for the operation $2^{j1}B=C$. FIG. 3b shows, in particular, a switch matrix in which a so-called double switch matrix is employed.

Figure 4:
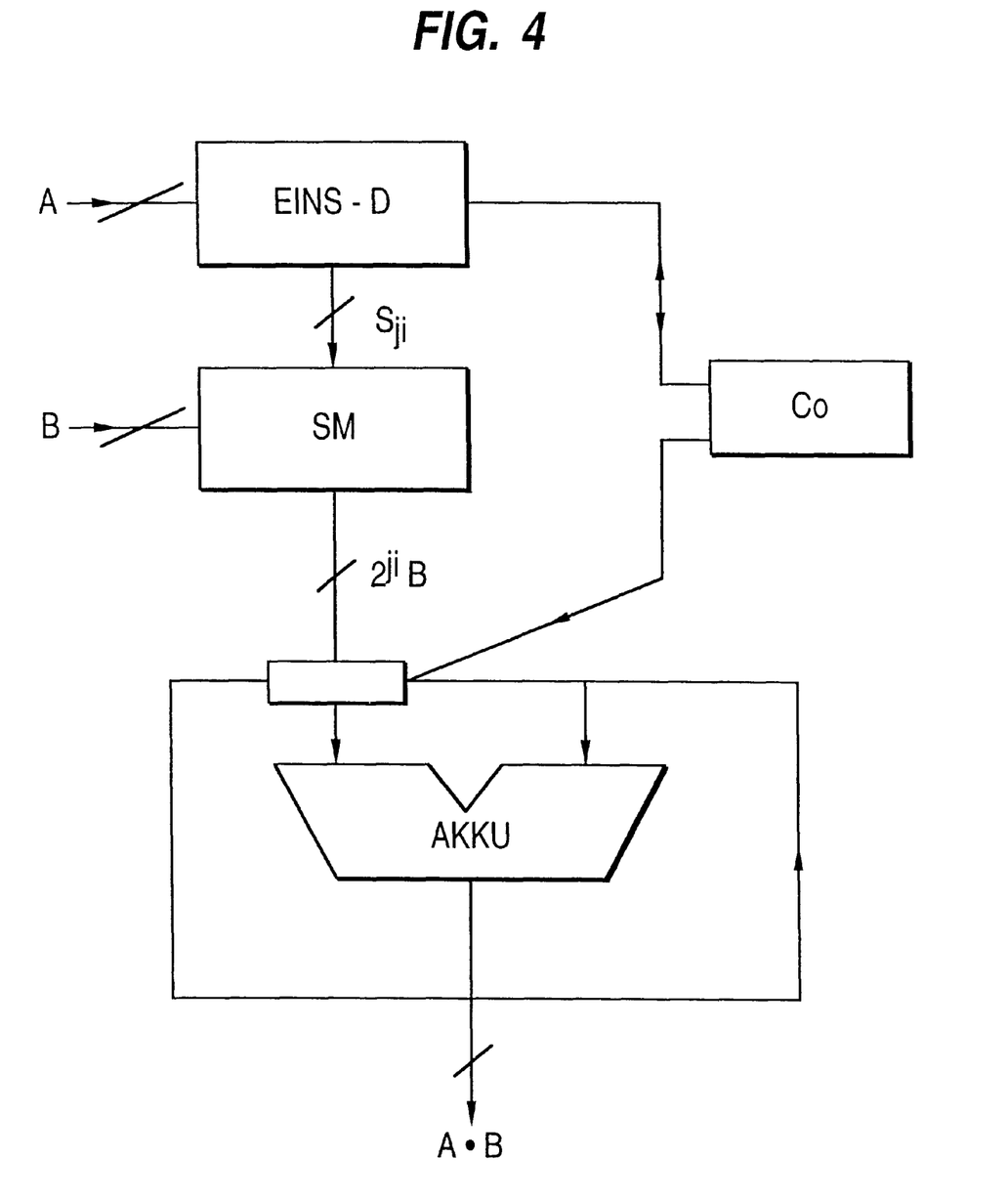

FIG. 4 shows a circuit arrangement in which the digital-logarithmic multiplication A*B according to the following combination occurs:

$$A*B=(2^{j1}+2^{j2}+\ldots)*B$$

The memory value A lies initially at a so-called ONE detector (EINS-D) which for its part is connected to a controller (CO) and to switch matrix (SM) connected thereafter, at which the input value B lies. Furthermore, a so-called accumulator (AKKU) is connected thereafter, at the output of which lies the combination A*B.

Figure 5:
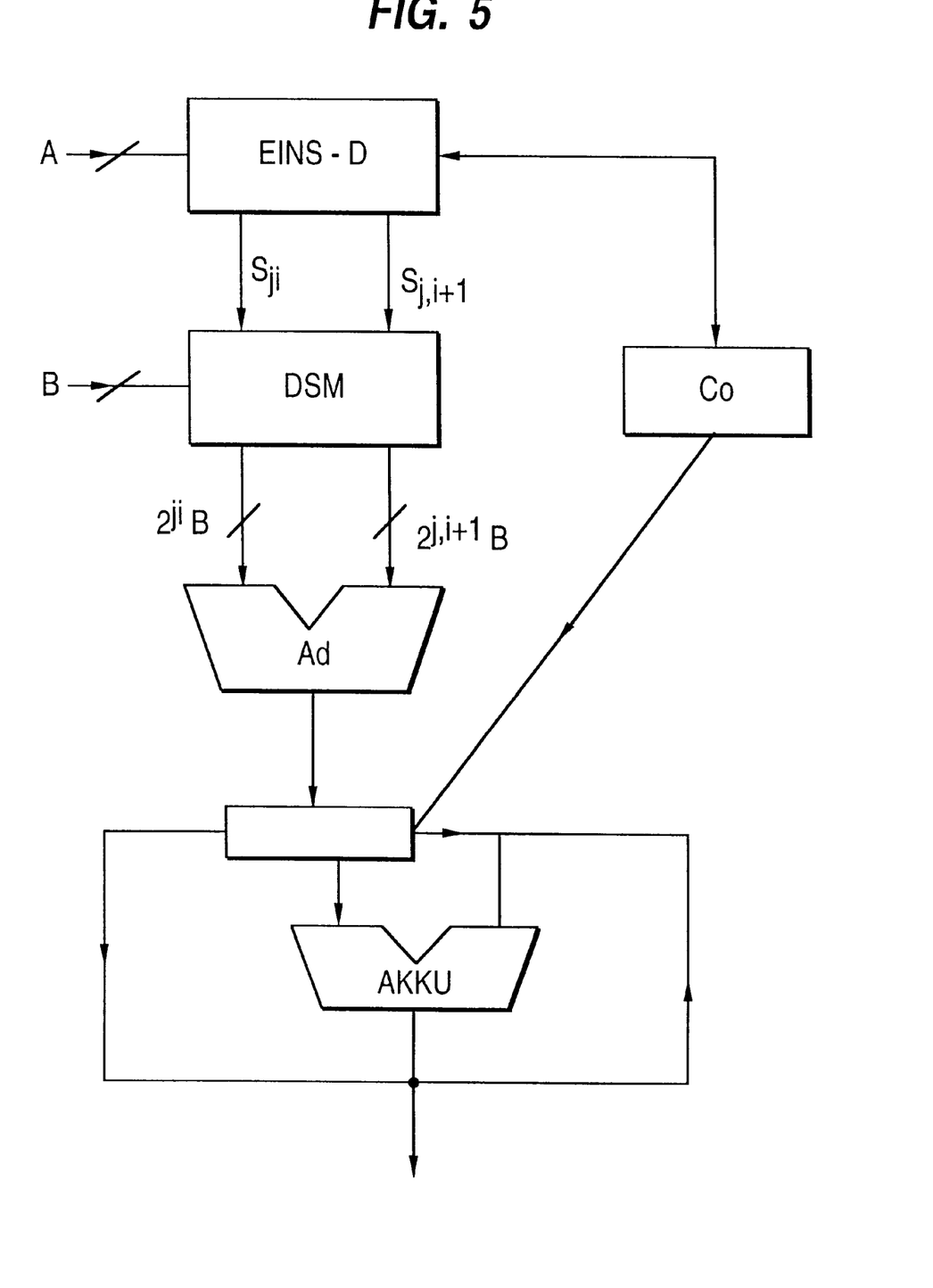
Figure 6:
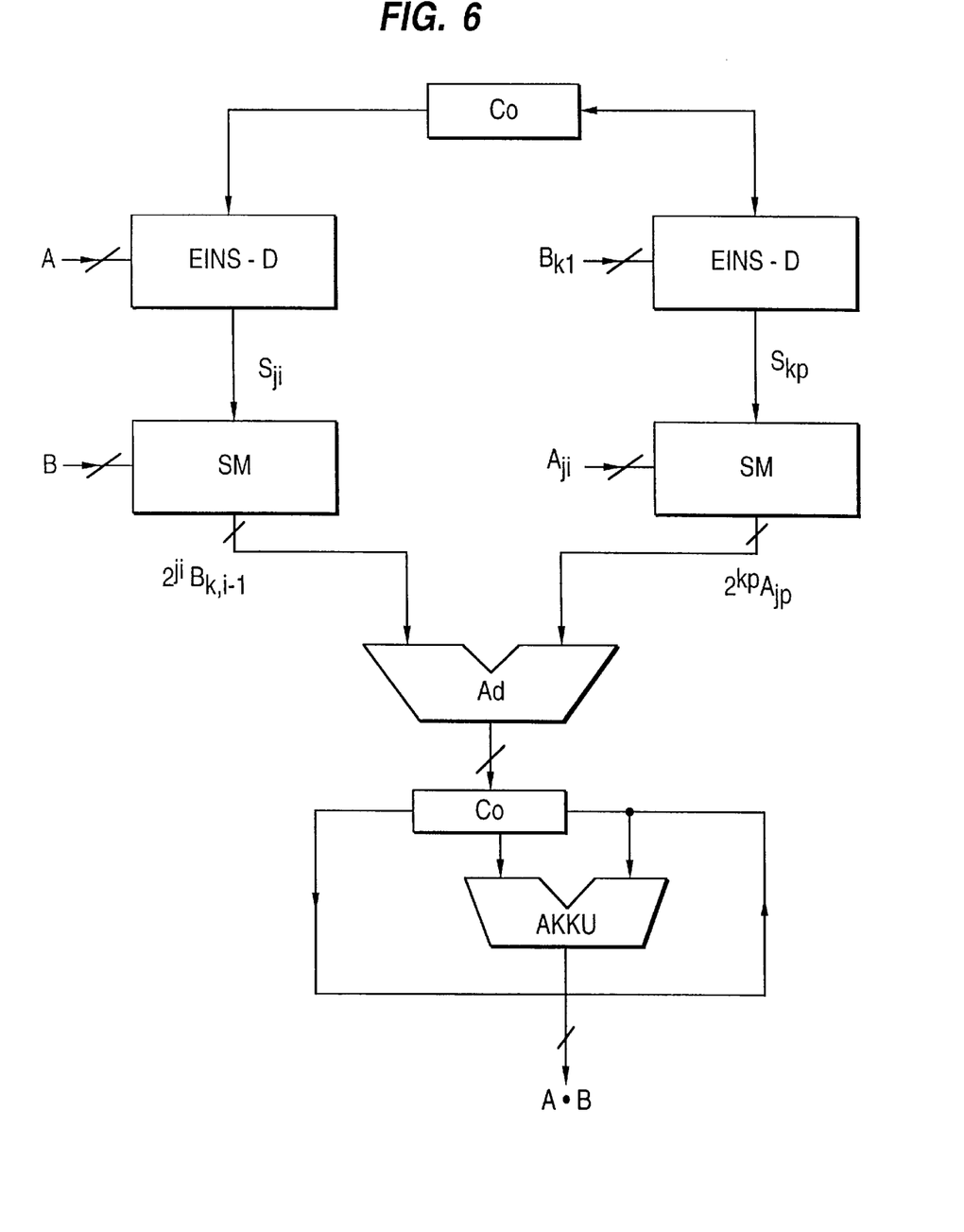

The circuit arrangement shown in FIG. 5 operates according to the same combination procedure as in FIG. 4, however, a so-called double switch matrix (DSM) is utilized, the outputs of which at first lie at an adder (Ad). Just as described in the preceding case, the combination product A*B is retained at the output connection of an accumulator connected in series. FIG. 6 shows another circuit arrangement in which the combination principle is represented as follows:

$$A*B=2^{j1}*B+2^{k1}*A_{j1}+A_{j1}*B_{k1}$$

An iteration connected in series occurs according to the following combination principle:

$$A_{j1}*B_{k1}=2^{j2}*B_{k1}+2^{k2}*A_{j2}+B_{k2}$$

The shown circuit arrangement is provided with a parallel circuit in which the parallel branches are composed each of a ONE detector (EINS-D) as well as a switch matrix (SM). The outputs of the parallel circuit lie at an adder (AD) which leads via a controller (CO) and an in-series-connected accumulator (AKKU) to the combination result A*B.

Figure 7:
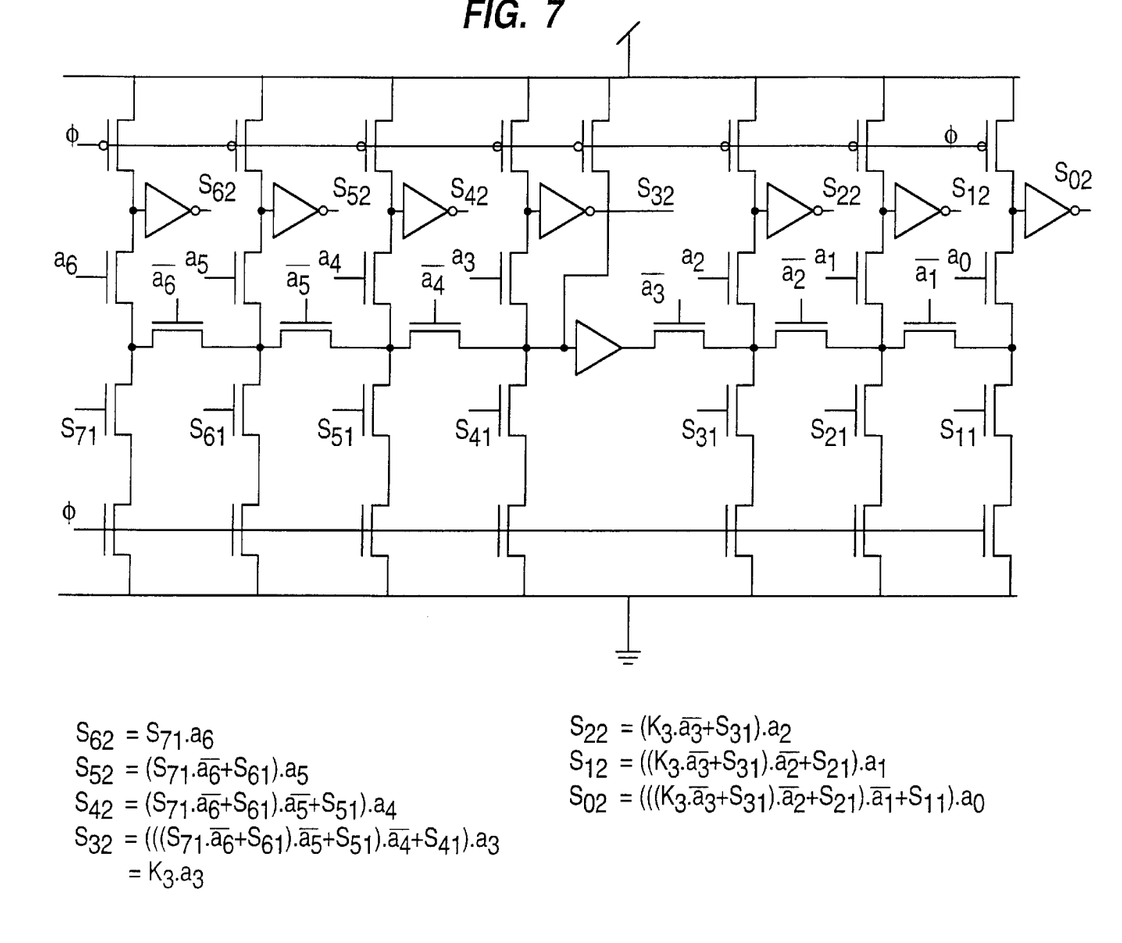

Finally, FIG. 7 shows a detector cycle for the segment $S_{j2}$ in which the second ONE occurs. Furthermore, the combination principles required for the segment combinations are given in FIG. 7.

The provided circuit arrangements permit processing data or signals which, on the one hand, have a great companding (great value range) and on the other a temporally rapid variability.

In principle, with the highest possible data rates of the multiplicand A per sample procedure A(m), a convolution value A(m) * B of correct order of magnitude can be determined. If A(m) is slowly variable, the multiplier for adaptive accuracy improvement of A * B is employed.

What is claimed is:

1. A circuit arrangement comprising:

means for digital multiplication of integers X and Y represented as:

$$X=2^{k}*(1+x_B)=2^k+X_B$$

$$Y=2^{l}*(1+y_B)=2^l+Y_B$$

where k, l, $X_B$ and $Y_B$ are integers; and adding means for adding output values as a result of the input values k, l, $X_B$, $Y_B$, and mixed terms $X_B*Y_B$ according to the multiplication $$X*Y=2^kY_B+2^lX_B+2^k2^l+X_B*Y_B$$

in dependence on a desired accuracy where the mixed terms $X_B*Y_B$ is either not formed or recursively calculated.

2. A circuit arrangement according to claim 1, further comprising a decoding means decodes an output value of the adding means.

3. A circuit arrangement according to claim 2, wherein the encoding means enables logarithmic encoding and includes a switch matrix for effecting logarithmic encoding.

4. A circuit arrangement according to claim 2, wherein said decoding means includes a shift register.

5. A circuit arrangement according to claim 3, wherein said decoding means includes a shift register.

* * * * *